United States Patent Office 2,900,422
Patented Aug. 18, 1959

2,900,422

MANUFACTURE OF PERCHLOROFLUOROPROPENES

Richard F. Stahl, Madison, and Cyril Woolf, Morristown, N.J., assignors to Allied Chemical Corporation, a corporation of New York No Drawing. Application May 20, 1957
Serial No. 660,035

2 Claims. (Cl. 260—653.4)

This invention relates to manufacture of perchlorofluoropropenes. More particularly, the invention is directed to production of $CCl_xF_yCCl=CCl_2$, in which $x$ is zero to 2 and $y$ is 1 to 3 and the sum of $x$ and $y$ is 3, by fluorination of $CCl_aF_bCCl=CCl_2$, in which $a$ is 1 to 3 and $b$ is zero to 2 and the sum of $a$ and $b$ is 3.

It has been proposed to make e.g. $CF_3CCl=CCl_2$ by HF fluorination of $CCl_3CCl=CCl_2$. However, in prior known methods fluorinating agents of the antimony type have been employed. With regard to fluorinating processes in general utilizing the antimony route, operating procedures are subject to many recognized disadvantages among which are the corrosiveness of the antimony halide, the difficulty of operation involved by reason of the use of liquid reactant as distinguished from a solid catalyst, and the relatively high volatility of antimony halides thereby giving rise to formation of products which contain small amounts of the fluorinating agent as impurity which is not easily removed. More particularly, with respect to production of e.g. $CF_3CCl=CCl_2$ by prior art fluorination of $CCl_3CCl=CCl_2$, if a relatively small amount of antimony fluorinating agent is used, fluorination is difficult and time-consuming, and if on the other hand a large amount of agent is employed, saturation of the double bond takes place resulting in the production of unwanted high boilers. Products formed by fluorination of $CCl_aF_bCCl=CCl_2$ are fairly high boiling, and separation of such products from antimony salts is difficult, particularly so for the monofluoropentachloropropene.

A major object of the present invention lies in the provision of a solid catalyst, gas-phase method for making the above products by HF fluorination of the indicated perhalogenated propene starting materials.

In accordance with the invention it has been found that certain zirconium tetrafluoride-activated carbon materials possess the properties of effectively promoting reaction of anhydrous HF and the hereindescribed perhalogenated propene starting materials by an easily controllable, all gas-phase, truly catalytic procedure in accordance with which the desired perchlorofluoropropene products may be made in good yields. Also, we find that inherent properties of these catalytic materials are such, under particular conditions, to promote selective formation of certain products. Further, it has been found that these zirconium tetrafluoride-activated carbon catalysts show no discernible tendency to promote reaction which would form saturated end products.

The catalytic material utilized in practice of the invention may be made for example by impregnating activated carbon, of say 4–14 mesh size granulation, with an aqueous solution of a zirconium salt, such as zirconyl chloride $ZrOCl_2$, and drying at 125–200° C. in an inert gas stream such as nitrogen. Then the material is gassed with HF to convert the zirconium to $ZrF_4$, temperatures being maintained above 125° C. and preferably at about 150–200° C. Water and HCl formed during the reaction pass off in the vapor state. Gassing with HF is continued until tail gases of the HF gassing operation indicate that evolution of HCl and water has ceased.

Raw material serving as the source of zirconium may be any zirconium salt which is soluble in vaporizable solvent and which reacts with HF to form $ZrF_4$ and a by-product vaporizing at the temperature of HF gassing. Thus, materials such as $ZrOCl_2$, $ZrO(NO_3)_2$, and $ZrOCO_3$, $ZrO(OH)_2$ and also anhydrous $ZrCl_4$ may be used. While aqueous hydrochloric acid and water are the more desirable solvents, other suitable solvents may be employed. For example, a catalyst containing 20 weight parts of $ZrF_4$ per 100 parts of Columbia 6G carbon may be made by dissolving 28 grams of substantially anhydrous $ZrCl_4$ in 200 cc. of 10% hydrochloric acid, adding the liquid to 100 grams of the carbon, evaporating to dryness, transferring the impregnated carbon into a tubular nickel reactor heated by electric furnace, and passing preferably anhydrous HF into the impregnated carbon maintained at about 150–200° C. until evolution of water and HCl ceases.

In making the catalyst, any of the commercially available activated carbons may be employed, e.g. Columbia 6G carbon, Columbia SW carbon, or Darco carbon. The relative quantities of activated carbon and e.g. zirconyl chloride initially employed may be such as to form an ultimate zirconium tetrafluoride-activated carbon mass which contains desirably a major quantity by weight of activated carbon and a minor quantity by weight of $ZrF_4$. On the other hand, amounts of zirconium salt and activated carbon may be such as to form a final zirconium tetrafluoride-activated carbon catalyst containing as little as about 5% by weight of $ZrF_4$. The catalyst preferably employed in practice of the invention may be considered as a zirconium tetrafluoride on activated carbon mass containing about 5–40% by weight of $ZrF_4$.

The $CCl_aF_bCCl=CCl_2$ perhalogenated propene starting materials of the invention include $CCl_3CCl=CCl_2$, B.P. 210° C.; $CCl_2FCCl=CCl_2$, B.P. 171° C.; and $CClF_2CCl=CCl_2$, B.P. 128° C. These materials may be used as starting materials individually or in any mixtures of the same. Preferred starting material is the hexachloropropene.

Practice of the invention involves subjecting gas-phase $CCl_aF_bCCl=CCl_2$ starting material to the action of gaseous anhydrous hydrogen fluoride in the presence of the hereindescribed zirconium tetrafluoride-activated carbon catalyst in a suitable reaction zone at the elevated fluorination temperatures, and recovering from the reaction zone exit perchlorofluoropropene which is more highly fluorinated than the starting material employed. Reactions involved may be represented by the following:

(a) $CCl_3CCl=CCl_2 + HF \rightarrow CCl_2FCCl=CCl_2 + HCl$
(b) $CCl_2FCCl=CCl_2 + HF \rightarrow CClF_2CCl=CCl_2 + HCl$
(c) $CClF_2CCl=CCl_2 + HF \rightarrow CF_3CCl=CCl_2 + HCl$ Reaction temperature in all embodiments of the invention is at least above the vaporization temperature of any and all of the starting materials employed. At such temperatures, in the presence of HF and the described catalyst, appreciable fluorination is effected at reasonable contact time. Usually, reaction temperature is not below 200° C. Temperatures as high as about 400° C. may be utilized without interfering appreciably with yields, and appreciably higher temperatures are undesirable in order to avoid splitting of the carbon atoms of the starting material. Other factors being equal, higher temperatures promoted higher degree of fluorination. Generally, preferred temperatures lie substantially in the range of 275–400° C., and particularly when it is desired to take advantage of the inherent properties of the catalyst with regard to promoting selective formation of dominantly $CCl_2FCCl=CCl_2$ and $CClF_2CCl=CCl_2$ preferred maximum temperature is about 375° C.

Mol ratio of HF to starting material is determined to some extent by the particular starting material used and the product desired to be formed. For example, in the manufacture of monofluoropentachloropropene from hexachloropropene, theoretical requirements of HF are one mol of HF per mol of hexachloropropene, and if it is desired to make a reactor exit organic product containing trifluorotrichloropropene, theory requirements of HF are approximately 3 mols of HF per mol of $CCl_3CCl=CCl_2$. While less than theoretical quantities of HF may be employed, depending upon the starting material used and the product desired, it is preferable to use quantities of HF which approach but do not substantially exceed stoichiometric proportions. It has been found that, when employing the catalysts described, if the HF molar ratio is increased appreciably above the 3:1 ratio utilization of HF decreases markedly with insufficient worthwhile increase of product formation. When using $CCl_3CCl=CCl_2$ as starting material and it is desired to make a reaction zone exit which, with respect to organic product, contains less than about 20% by weight of $CF_3CCl=CCl_2$, and is dominantly $CCl_2FCCl=CCl_2$ and $CClF_2CCl=CCl_2$, it is preferred to utilize temperature not above about 375° C. and a mol ratio of HF to $CCl_3CCl=CCl_2$ of about and not more than 3 mol proportions of HF to one mol proportion of $CCl_3CCl=CCl_2$.

Contact time may be varied considerably without noticeable disadvantage to high process efficiency. Increasing contact time and reactor temperature result in higher HF conversion and higher conversion of starting material to sought-for product, and lowering contact time and reactor temperature result in lower HF conversion and greater conversion of hexachloropropene to the $CClF_2CCl=CCl_2$ and $CCl_2FCCl=CCl_2$. In general, contact time may lie in the range of 1 to 25 seconds, and more usually in the range of 2 to 20 seconds. To a substantial extent, contact time, reaction temperature and ratio of reactants are interrelated, and product composition may be varied by alteration of one or more of these factors. Depending upon the starting material used and the product desired, optimum conditions may be determined by test runs.

In general practice, organic starting material and anhydrous HF are vaporized and metered into a tubular reactor packed with catalyst, made of suitable inert material such as nickel, and provided with external heating equipment preferably including automatic means for maintaining given temperatures in the reaction zone. Product recovery may be effected more or less conventionally as in this art. For example, reactor exit gases may be passed into a water scrubber to absorb HCl and excess HF, and to condense the organic products and any unreacted starting material. Organics and water may be separated by stratification and decantation, and after drying and filtering, the organics may be separated and isolated by distillation.

The following typifies practice of the invention. A reactor, comprising a 1" I.D. nickel tube about 26" long and enveloped substantially throughout its length by an electrical heating unit, was packed with 400 cc. of $ZrF_4$-on-activated carbon catalyst made as follows: Commercial $ZrCl_4$ was dissolved in water and poured over Columbia 6G activated carbon, the amount of the $ZrCl_4$ being 30% by weight based on the carbon. The mixture was evaporated to dryness and charged into the reactor. Temperature was maintained at 200° C. to drive off residual water, and then the mass was gassed with anhydrous HF to about 200° C. until evolution of HCl ceased. The finished catalyst contained about 21% by weight of $ZrF_4$. Thereafter, over the course of about 4 hours, about 338 g. of gaseous anhydrous HF and about 1113 g. of vaporized $CCl_3CCl=CCl_2$ were metered and fed into the reactor. Mol ratio of HF to organic starting material was about 3:1. Throughout the run, internal temperature in the reactor was maintained at about 345° C., and contact time was about 18 seconds. Exit gases of the reactor were passed into a water scrubber in which HCl and excess HF were absorbed, and the organic products condensed. The organic and water layers were separated, and the organic layer was dried with $CaCl_2$ and filtered. Materials exiting the reactor amounted to about 1234 g., and 897 g. of organic products were recovered. Average HF conversion was about 50 mol percent, and yield of chlorofluoropropenes was about 91.5 mol percent of theory. The 897 g. of dried and filtered organic products were distilled, and there were recovered as condensates a forerun fraction boiling in the range of about 30–84° C. comprising low boilers and amounting to about 2.4% by weight of the material subjected to distillation; a second fraction boiling at about 88° C., identified by analysis as $CF_3CCl=CCl_2$, and amounting to about 13% of the material subjected to distillation; a third fraction boiling at about 128° C., identified by analysis as $CClF_2CCl=CCl_2$, and amounting to about 47.2% of the organic material subjected to distillation; and a fourth fraction boiling at about 171° C. amounting to about 37.4% of the material subjected to distillation, and identified by analysis as $CFCl_2CCl=CCl_2$ containing a small quantity of unreacted starting material. No saturates were found in the organic reaction products. $CF_3CCl=CCl_2$ is a known compound and may be used, for example as known in the art, as a starting material for cobaltic trifluoride fluorination to 2,3,3-trichloropentafluoropropane.

We claim:
1. The process for making an organic reaction product containing $CCl_2FCCl=CCl_2$ and $CClF_2CCl=CCl_2$ which comprises subjecting gas-phase starting material, of the group consisting of $CCl_3CCl=CCl_2$ and $CCl_2FCCl=CCl_2$, at temperatures substantially in the range of 200–375° C. and while in the presence of zirconium tetrafluoride-activated carbon catalyst to the action of anhydrous HF in quantity, depending upon the starting material employed and product desired, approaching but not substantially in excess of stoichiometric proportions, for a time sufficient to fluorinate a substantial amount of said starting material and to form a substantial quantity of organic reaction product containing dominantly $CClF_2CCl=CCl_2$ and $CCl_2FCCl=CCl_2$, and recovering perchlorofluoropropene which is more highly fluorinated than said starting material.

2. The process which comprises subjecting gas-phase $CCl_3CCl=CCl_2$ starting material, at temperatures substantially in the range of 200–375° C. and while in the presence of zirconium tetrafluoride-activated carbon catalyst containing about 5–40% by weight of $ZrF_4$ to the action of anhydrous HF in quantity, approaching but not substantially in excess of two mols of HF per mol of starting material, for a time sufficient to fluorinate a substantial amount of said starting material and to form a substantial quantity of organic reaction product containing dominantly $CClF_2CCl=CCl_2$ and $$CCl_2FCCl=CCl_2$$

and recovering $CClF_2CCl=CCl_2$ and $CCl_2FCCl=CCl_2$ from said reaction product.

References Cited in the file of this patent

UNITED STATES PATENTS

| | | |
|---|---|---|
| 2,558,703 | Gochenour | June 26, 1951 |
| 2,709,688 | Bandes et al. | May 31, 1955 |
| 2,714,618 | Woolf | Aug. 2, 1955 |

FOREIGN PATENTS

| | | |
|---|---|---|
| 623,227 | Great Britain | May 13, 1949 |